Nov. 26, 1957

D. E. SCHMIDT 2,814,361

MOTOR VEHICLE PARKING LOCK DEVICE

Filed Sept. 20, 1954

INVENTOR.
DONALD E. SCHMIDT
BY Paul O. Pippel
ATTY.

Nov. 26, 1957  D. E. SCHMIDT  2,814,361
MOTOR VEHICLE PARKING LOCK DEVICE
Filed Sept. 20, 1954  3 Sheets-Sheet 2
FIG. 3
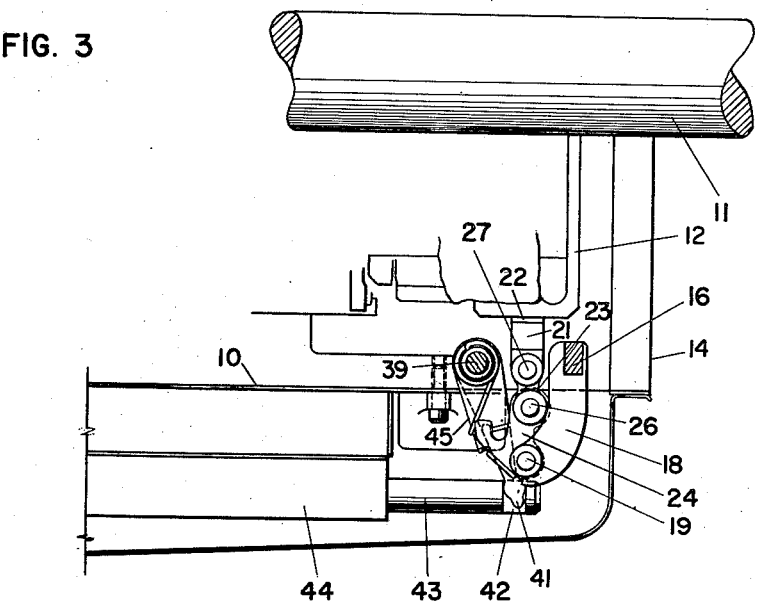
FIG. 5  FIG. 6  FIG. 7
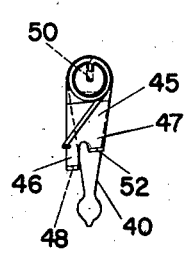 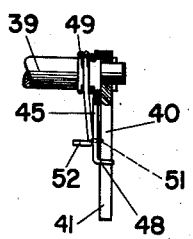 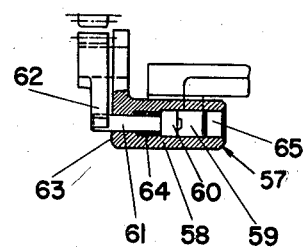
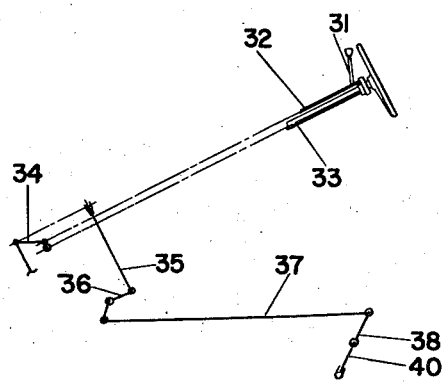
FIG. 4
INVENTOR.
DONALD E. SCHMIDT
BY Paul O. Pippel
ATTY.

Nov. 26, 1957   D. E. SCHMIDT   2,814,361
MOTOR VEHICLE PARKING LOCK DEVICE
Filed Sept. 20, 1954   3 Sheets-Sheet 3
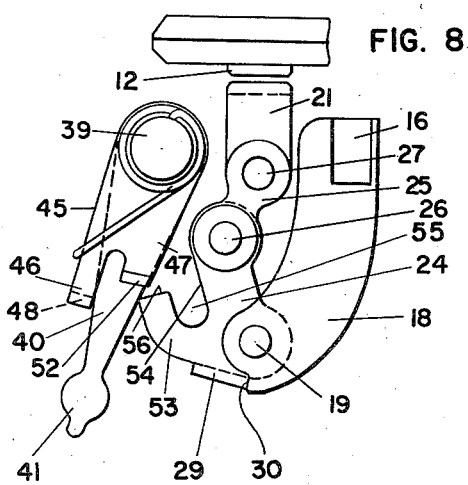
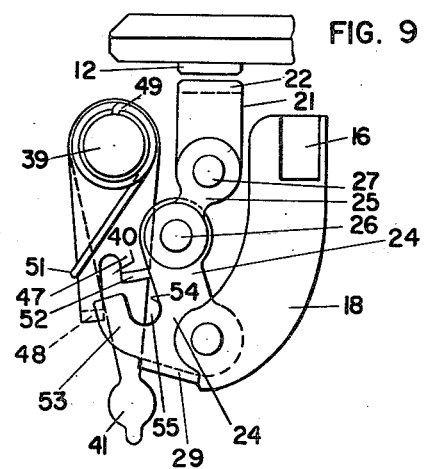
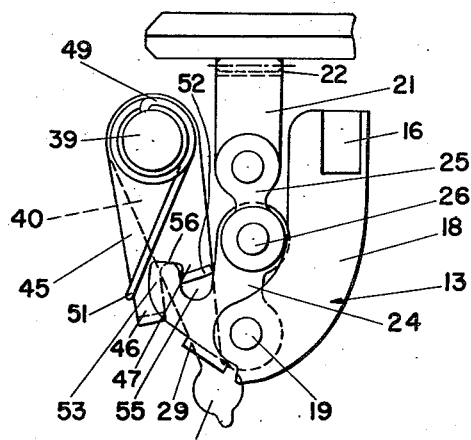
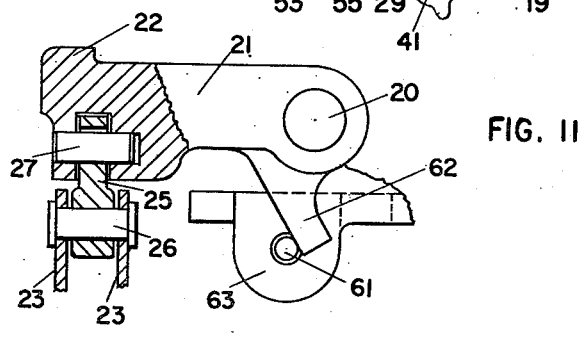
INVENTOR.
DONALD E. SCHMIDT
BY Paul O. Pippel
ATTY.

United States Patent Office 2,814,361
Patented Nov. 26, 1957

2,814,361

MOTOR VEHICLE PARKING LOCK DEVICE

Donald E. Schmidt, Fort Wayne, Ind., assignor to International Harvester Company, a corporation of New Jersey Application September 20, 1954, Serial No. 457,048

2 Claims. (Cl. 188—69)

This invention relates to a motor vehicle parking lock or brake and more particularly to a new and improved releasable lock device for positively engaging the propeller or drive shaft of a motor vehicle to prevent accidental forward and rearward motion of the vehicle when parked.

The laws of most states require and thus motor vehicles are generally equipped with parking brakes which are conditionable to prevent accidental movement of the vehicle when left unattended. Heretofore most vehicles were provided with parking brakes of the type which included friction elements such as bands and plates which were movable into frictional engagement with cooperating elements carried by the drive or propeller shaft to thereby prevent rotation of the same. A brake control member for applying and releasing the friction brake elements was generally located under the instrument panel where the vehicle operator could not conveniently grasp the same in order to operate the brake. Furthermore, the braking force tending to prevent rotation of the propeller shaft was directly dependent upon the amount of manual effort exerted by the vehicle operator so that the operator expended a great deal of energy to insure adequate braking of the propeller shaft. Not only were friction type parking brakes inaccessible and somewhat difficult to operate, but the problem of maintaining the brakes in condition for efficient operation was difficult because of the rapidity at which the friction elements became worn and deteriorated in use. Oftentimes the parking brakes were partially applied before the vehicles were completely stopped causing the friction elements to wear at a fast rate. Frequently the parking brakes were inadvertently left in their engaged position even though the vehicles had attained some forward or rearward motion causing the friction elements to wear rapidly. All of the above mentioned abnormal causes of wear as well as the wear normally experienced after long periods of use contributed to the danger of a complete or partial failure of the parking brake at some unforeseen time to thus render leaving the vehicle parked on an upgrade or downgrade unattended unsafe.

In the operation of commercial vehicles such as motor trucks used in a delivery service where many stops are made per day on the delivery route the parking brake is generally applied and released at each of the many stops and consequently the wear rate of the friction elements is much higher than the wear rate in conventional passenger vehicles. Furthermore, the application of the parking brake at each of the stops requires the exerting of a heavy pull on the brake control member a great many times per working day which tends to fatigue the vehicle operator.

Heretofore with vehicles equipped with conventional change-speed transmissions and friction clutches the braking characteristic of the engine could be relied on to assist the friction type parking brake and prevent the vehicle from rolling down a grade out of control. However, with the advent of automatic and semi-automatic type transmissions wherein fluid couplings or torque converters are employed the braking characteristics of the engine at low speeds is negligible. It is therefore the primary objective of the present invention to provide a positive, as distinguished from a friction type, parking lock which is controlled by a lever which is conveniently mounted on the steering column and which requires very little effort on the part of the operator to operate.

A further object is the provision of a simple and effective means for preventing the rotation of the propeller or drive shaft of a motor vehicle.

A still further object is the provision of a unique toggle mechanism for moving a locking pawl or dog into and out of engagement with a gear carried by the vehicle propeller shaft.

Another object is the provision of means to guard against the possibility of the locking dog from becoming disengaged when the propeller shaft is subjected to a force tending to rotate the same.

Still another object is to provide a positive-type releasable lock device for a motor vehicle which is controlled by means of a lever which is conveniently mounted on the steering column and requires very little effort to operate.

A still further object is the provision of an improved yieldable or resilient means, under control of the vehicle operator, for urging the lock pawl into engagement with the output or drive shaft gear teeth regardless of whether the pawl is in registration with the teeth of the gear or not in order to prevent the operator from forcefully jamming and breaking the various parts if the pawl is not in registration with the gear teeth.

Another important object is the provision of an inhibitor means controlled by vehicle speed to prevent the pawl from partially or fully engaging the propeller shaft gear teeth before the vehicle speed is reduced to a safe minimum.

The foregoing and other important objects and desirable features inherent in and encompassed by the invention together with many of the purposes and uses thereof will become readily apparent from the ensuing description in conjunction with the annexed drawings, in which:

Figure 3 is a fragmentary side sectional view of the invention taken substantially along line 3—3 of Figure 2;

Figure 4 is a diagrammatic view of the control linkage extending from the steering column to the transmission casing;

Figures 5 and 6 are detailed views of a part of the mechanism for actuating the locking pawl;

Figure 7 is a detailed view, partially in section, of the inhibitor means;

Figure 8 is a fragmentary view of part of the actuating structure and locking pawl showing the pawl fully disengaged;

Figure 9 is a view similar to Figure 8 disclosing a portion of the actuating structure in a position different from that shown in Figure 8;

Figure 10 is a view similar to Figure 8 showing the pawl fully engaged; and

Figure 11 is a detailed view of the locking pawl.

Figure 1:
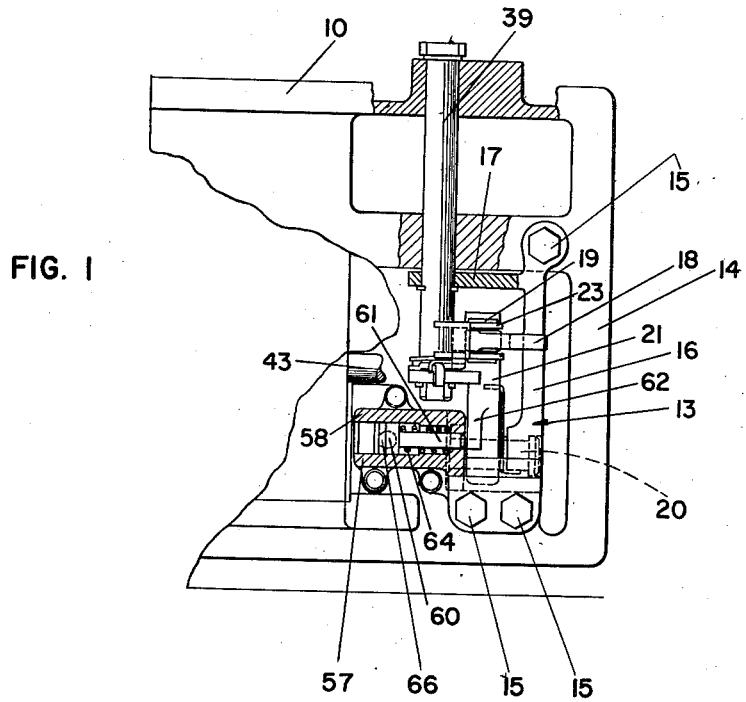
Figure 1 is a fragmentary bottom view, partially in section, of a transmission casing embodying the invention.

Referring to the drawings wherein like reference characters designate like elements throughout the various views, a transmission casing 10 is partially shown having a drive or propeller shaft 11 extending rearwardly therefrom. The shaft 11 is operatively connected to the vehicle drive wheels in a conventional manner and is adapted to rotate whenever the vehicle is in motion. In the present invention a gear 12 is provided which is rigidly keyed or otherwise suitably secured to the shaft 11. The gear 12 may form a part of the transmission gearing or may be provided solely for the purpose of being engaged by the locking device to be described hereinafter.

Figure 2:
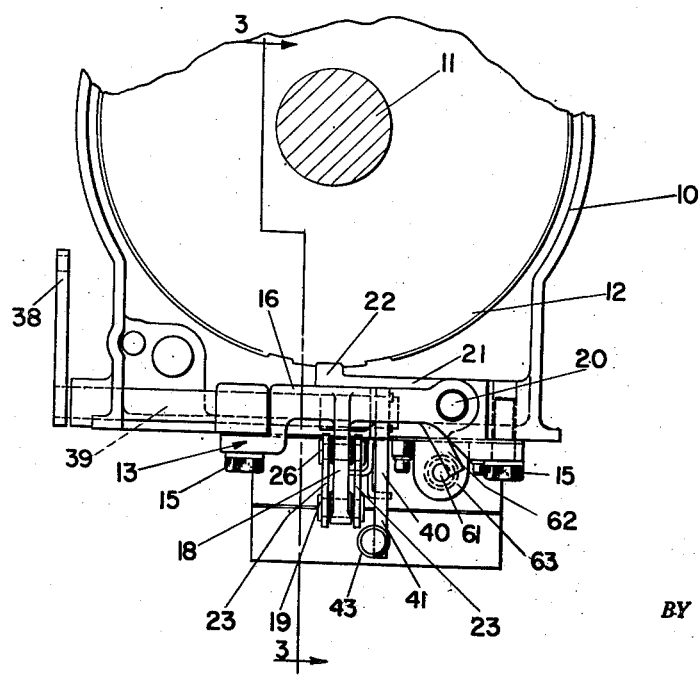
Figure 2 is an end elevational view of the transmission casing partially broken away to better illustrate the invention.

As shown in Figures 1 and 2 a support bracket 13 is secured to the bottom face of the transmission casing 10 adjacent the rear end wall 14 by means of bolts 15. The bracket 13 includes a main body portion 16 extending transversely with respect to the rotational axis of the drive shaft 11. Integrally formed with the body portion 16 are a pair of arms 17 and 18. Arm 17 extends longitudinally horizontally and is provided with an opening therein adjacent its end for a purpose which will be explained hereinafter. Arm 18 curves downwardly and forwardly from the body portion 16 and is adapted to support a pivot pin 19 adjacent its lowermost end. The body portion 16 also supports a longitudinally extending, horizontal pivot pin 20 upon which one end of a locking pawl 21 is journalled. The locking pawl 21 includes a pawl tooth 22 which is adapted to move into and out of meshing engagement with the teeth on gear 12 by pivoting about pivot pin 20.

One end of each of a pair of elongated plates is connected to the pivot pin 19. The plates 23 are exact duplicates of each other and together they form a lever 24. The free end of lever 24 is pivotally connected to one end of a link 25 by means of a pin 26. The opposite end of link 25 is, in turn, pivotally connected to the locking pawl 21 at a point vertically aligned with the pawl tooth 22 by means of a pivot pin 27. The foregoing structure is constructed so that pivot pin 19 and pivot pin 27 lie in a common, transversely extending vertical plane at all times for a purpose which will be explained hereinafter.

Each of the plates 23 is provided with a tab 29 adjacent its lowermost end which extends toward the other plate. The tabs 29 are adapted to engage a shoulder 30 formed on the arm 18 to limit the pivotal movement of the lever 24 in one direction. Pivotal movement of the lever 24 in the opposite direction is limited by arm 18 which is engaged by the link 25, as shown in Figure 3. From the foregoing it will be appreciated that rocking of lever 24 about pivot pin 19 causes the locking pawl 21 to be pivoted about pivot pin 20 and the pawl tooth 22 is completely disengaged to the teeth of gear 12 when the lever 24 is in the position shown in Figure 8 wherein lugs 29 engage the shoulder 30. Movement of the lever 24 in a clockwise direction, as viewed in Figure 8, to the position shown in Figure 10, causes the pawl tooth 22 to move vertically into meshing engagement with the teeth on the gear 12 to thus lock the same against rotation. In this latter position of the lever 24 the portion of the link 25 encircling the pivot pin 26 engages the arm 18. It will also be noted that pivot pin 26 moves from one side of the transversely extending vertical plane containing the pivot pins 27 and 19 to the opposite side of the plane during the movement of the lever 24 from the position shown in Figure 8 to the position shown in Figure 10. Because of the over-center action of the pivot pin 26 when the lever 24 moves from the position shown in Figure 8, corresponding to the pawl disengaged position, to the position shown in Figure 10, corresponding to the pawl gear-engaging position, the possibility of the pawl tooth 22 being disengaged when the propeller shaft 11 is under a load is mitigated. Furthermore, the over-center action of the actuating linkage described above enables the tangential force of the load on the pawl 21 to be transmitted directly to the supporting bracket 13 and the radial force is also transmitted to the supporting bracket 13 through link 25. It will be appreciated, therefore, that since the load of the shaft 11 is transmitted to the support bracket 13 substantially directly and not through the medium of the actuating linkage, the actuating linkage can be constructed of relatively light-weight members.

As shown somewhat diagrammatically in Figure 4, the means for rocking the lever 24 to engage and disengage the pawl tooth 22 from the gear 12 includes a shift control lever 31 disposed contiguous to the vehicle steering wheel and connected to a rod 32 which has its ends rotatably supported by the steering column 33. The rod 32 has an arm 34 secured thereto adjacent its lower end which is connected to a link 35. The link 35 is pivotally connected to a two-arm bellcrank 36 which is pivotally mounted on the chassis frame (not shown). A rearwardly extending link 37 interconnects the bellcrank 36 with an arm 38 which is suitably keyed to one end of a shaft 39 exteriorly of the transmission casing 10. The shaft 39 extends transversely with respect to the transmission casing 10 and through the opening in arm 17 and is journalled for rocking movement therein. A second arm 40, suitably keyed to the opposite end of the shaft 39, is provided with a spherical terminal end 41 which is received in an aperture 42 formed in one end of a valve rod 43. The valve rod 43 is capable of reciprocating in a valve body 44 to various positions in order to establish different gear ratios in the transmission. Inasmuch as the transmission per se as well as the means for controlling the operation of the same form no part of the present invention they are not shown in detail nor will they be described. However, it is to be understood that the operating linkage from the shaft control lever 31 to the arm 40 used to manually control the operation of the transmission is utilized to actuate the releasable parking lock device which is the subject of the present invention. From the foregoing it will be apparent that rocking of shift lever 31 causes shaft 39 to rock which in turn swings arm 40 in a vertical plane.

As best shown in Figures 5 and 6 a plate-like arm 45 is mounted on the shaft 39 for pivotal movement in a plane parallel to the plane containing the arm 40. The arm 45 is provided with a pair of spaced legs 46 and 47. The terminal end of leg 46 is bent at right angles with respect to the general plane containing the arm 45 to provide a lug 48 which projects into the path of movement of the arm 40, as best shown in Figure 6. A coil spring 49 encircles the shaft 39 and has one end thereof disposed in a radial recess 50 formed in the shaft 39. The opposite end of the spring 49 is formed as a hook 51 and is looped over and engages a side marginal edge of the leg 46. From the foregoing, it will be apparent that the spring 49 yieldably urges the lug 48 into abutting engagement with the arm 40. It will also be appreciated that clockwise movement of arm 40, by rocking shaft 39 in a clockwise direction, as viewed in Figure 5, causes the arm 45 to be positively rocked in a clockwise direction when the arm 40 engages the lug 48. However, arm 40 and shaft 39 are capable of rocking in a clockwise direction, as viewed in Figure 5, with respect to the arm 45 thereby increasing the yieldable or resilient force of the spring 49.

Rocking of the lever 31 downwardly from the plane of the paper, as viewed in Figure 4, effects counterclockwise movement of arm 40, as viewed in Figure 8. It is to be understood that the clockwise movement of arm 40 from the position shown in Figure 8 has no effect whatsoever upon the operation of the transmission. Inasmuch as the arm 40 and arm 45 are connected together by means of the spring 49, such counterclockwise rotation of the shaft 39 is transmitted to the arm 45 to cause the arm 45 to move counterclockwise in unison with the arm 40. The arms 40 and 45 continue to move counterclockwise in unison until a lug 52, formed on the terminal end of leg 47 and projecting in a direction opposite the lug 48, engages the lever 24 intermediate the pivot pins 26 and 19, as shown in Figure 9. Continued rocking of the lever in a counterclockwise direction causes the lever 24 to pivot in a tain operating conditions of the vehicle for controlling the operation of the transmission. At least one governor is driven by the propeller shaft of the vehicle and the pressure of the oil modulated thereby is a direct indication of the vehicle speed. In other words, the pressure of the oil delivered by the pump controlled by the governor increases substantially in direct proportion to the vehicle speed. In the present invention oil whose pressure is regulated by the propeller shaft governor is introduced into the bore 59 through port 66. It will be appreciated that when the pressure of the oil delivered to the bore 59 exceeds a predetermined value the piston 60 moves to the left as viewed in Figure 7 compressing the spring 64 causing the inhibitor pin 61 to project beyond the end face 63 of the body 58 into the path of movement of the arm 62. With the pawl 21 in its disengaged position and the inhibitor pin 61 projecting beyond the end face 63, it will be appreciated that movement of the manual control shift lever 31 to the position corresponding to the pawl-engaged position will be ineffective to move the pawl tooth 22 into engagement with the gear 12. However, when the vehicle slows to a predetermined speed thereby lowering the pressure of the oil delivered to the bore 59, the length of spring 64 increases to withdraw the inhibitor pin 61 from engagement with the arm 62. Thereafter the pawl 21 is free to pivot into engagement with the gear 12. It has been found, as an example, in an actual installation, that at vehicle speeds of seven miles per hour or more it would be unsafe to engage the pawl tooth 22 with the gear 12, and in this test installation it was determined that the oil pressure modulated by the governor was at least one pound per square inch. Hence a spring 64 which was capable of urging the piston 60 to the right, as viewed in Figure 7, whenever the oil pressure fell below one pound per square inch was chosen. While an inhibitor device is shown which is actuated by oil under pressure, it is to be understood that the pin 61 could be moved into and out of blocking relationship with the arm 62 by mechanical means without departing from the spirit and scope of the invention.

The embodiment of the invention chosen for the purposes of illustration and description herein is that preferred for achieving the objects of the invention and developing the utility thereof in the most desirable manner, due regard being given to existing factors of economy, simplicity of design, and construction and in the improvements sought to be effected. It will be appreciated therefore that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle having a drive shaft rotatable when the vehicle is in motion, said shaft having a gear secured thereto; a releasable lock device for positively preventing rotation of said shaft including a pivotally mounted pawl adapted to pivot between a normal, inoperative position and an operative, gear-engaging position; means for moving said pawl between its inoperative and operative positions including a lever having one end pivotally connected to a relatively fixed support, a link having one end pivotally connected to said pawl, pivot connection means for interconnecting said link and lever, and first and second stop means individually engageable by said lever for limiting the pivotal movement of said lever, said pivot connection means being disposed on one side of a plane containing the pivotal axes of the connections of said link and lever to said pawl and fixed support, respectively, when said lever engages said first stop means and being disposed on the opposite side of said plane when said lever engages said second stop means, said pawl being in its inoperative position when said lever engages said first stop means and being in its operative position when said lever engages said second stop means; and manually operable means for impressing a yieldable force on said lever tending to urge said lever from said first stop means to engagement with said second stop means when operated in one direction, said manually operable means being capable of overcoming said yieldable force and for positively moving said lever from said second stop means to engagement with said first stop means when operated in a reverse direction.

2. In a motor vehicle having a drive shaft rotatable when the vehicle is in motion, said shaft having a gear secured thereto; a releasable lock device for positively preventing rotation of said shaft including a pivotally mounted pawl adapted to pivot between a normal, inoperative position and an operative, gear-engaging position; means for moving said pawl between its inoperative and operative positions including a lever having one end pivotally connected to a relatively fixed support, a link having one end pivotally connected to said pawl, pivot connection means for interconnecting said link and lever, and first and second stop means individually engageable by said lever for limiting the pivotal movement of said lever, said pivot connection means being disposed on one side of a plane containing the pivotal connection of the axes of said link and lever to said pawl and fixed support, respectively, when said lever engages said first stop means and being disposed on the opposite side of said plane when said lever engages said second stop means, said pawl being in its inoperative position when said lever engages said first stop means and being in its operative position when said lever engages said second stop means; means for moving said lever between said first and second stop means including a manually rotatable shaft journalled on a relatively fixed support, a second lever keyed to said shaft for rotation therewith, said second lever being swingable between first and second positions corresponding to said pawl normal and operative positions, respectively; an arm mounted on said shaft for swinging movement in a plane adjacent to and parallel to said second lever, said arm having a first lug projecting therefrom in the path of movement of said second lever and a second lug projecting therefrom, said second lug being swingable in a path overlapping a portion of the path of movement of said first lever whereby said second lug is swingable into and out of operative engagement with said first mentioned lever; spring means interconnecting said arm and shaft whereby said first lug is urged into abutting engagement with said second lever, and said second arm and second lever are constrained to swing in unison for a portion of the total swinging movement of said second lever from said first position to said second position until said second lug operatively engages said first mentioned lever, said second lever being relatively swingable with respect to said first lug for the remaining portion of the total swinging movement of said second lever from said first position to said second position to energize said spring means and cause said second lug to be yieldably urged against said first mentioned lever, said spring means tending to urge said first mentioned lever from said first stop means to said second stop means, initial movement of said second lever from its second position to its first position relatively to said arm causing said second lever to engage said first lug and establish a positive drive connection between said arm and said second lever, continued movement of said lever in the same direction causing said second lug to be moved out of operative engagement with said first mentioned lever.

References Cited in the file of this patent

UNITED STATES PATENTS

| 2,306,739 | Maier | Dec. 29, 1942 |
| 2,395,893 | Marlow | Mar. 5, 1946 |
| 2,653,689 | Hasbany | Sept. 29, 1953 |
| 2,670,064 | Hasbany | Feb. 23, 1954 | clockwise direction, as viewed in Figure 9, because of the resilient action of the spring 49 which operatively connects the shaft 39 and the lever 45. Such pivotal movement of the lever 24 continues until link 25 engages arm 18, as shown in Figure 10. During the movement of the arm 24 and link 25 from the position shown in Figure 9 to the position shown in Figure 10, the pawl tooth 22 is elevated into meshing engagement with the teeth on gear 12 by being pivoted about pivot pin 20, to thereby positively lock the drive shaft 11 against rotation and consequently prevent accidental or other movement of the vehicle once it has assumed its gear-engaging position.

It will be appreciated that movement of the lever 40 in a counterclockwise direction, as viewed in Figure 10, with respect to the arm 45, resulting in the arm 40 from being disengaged from the lug 48, is permitted by virtue of the spring 49 operatively connecting the arms 40 and 45, but such relative movement is resiliently resisted by the spring 49. Consequently, the greater the relative movement of the arm 40, with respect to the arm 45, the greater will be the yieldable force developed by the spring 40. Thus, when the pawl 21 is in its gear-engaging position, as shown in Figure 10, and the lever 24 is at its extreme limit of clockwise movement, and the lever 40 is also at its extreme limit of counterclockwise movement, the arm 40 is normally angularly spaced from the lug 48, with the result that a continuous resilient force is impressed upon the lever 24, tending to maintain the same in the position shown in Figure 10. However, it is quite possible that when the propeller shaft 11 is not rotating, and the shift control lever 31 is actuated in a direction to cause engagement of the pawl tooth 22 with the gear 12, the pawl tooth 21 is not in registration or in a position to mesh with the gear teeth on the gear 12, and it may impinge and abut the top surface of a tooth of gear 12 to prevent positive locking of shaft 11. When this occurs, lever 24 is prevented from moving to the position shown in Figure 10, and the arm 45, which positively engages the lever 24, is also prevented from moving to its extreme counterclockwise position. However, since a positive-type of linkage operatively interconnects the gear-shift lever 31 and the arm 40, the arm 40 is moved to the position shown in Figure 10 regardless of the fact that the pawl tooth 22 is unable to mesh with the gear 12, and the arm 45 is thus prevented from moving to its extreme counterclockwise position. It will be obvious that such relative movement of the arm 40 with respect to arm 45 causes the spring 49 to exert a greater resilient force upon the lever 24. Hence, a slight movement of the vehicle in a forward or rearward direction, after the shift lever 31 and arm 40 have been actuated to their respective positions corresponding to the pawl-engaged position, will cause the gear 12 to rotate, and the resilient force of spring 49, acting on lever 24 through the medium of arm 45, will then immediately move the pawl tooth 22 of the pawl 21 into positive locking engagement with the gear 12 as soon as the pawl tooth 22 comes into registration with the teeth of the gear 12. By virtue of the over-travel action of the arm 40, with respect to the arm 45, the vehicle operator is prevented from forcibly jamming the lock pawl tooth 22 into mesh with the teeth on gear 12 until the powl tooth 22 is in registration with the teeth on gear 12. It will be appreciated that if the actuating linkage from the shift control lever 31 to the pawl 21 was positive, certain components thereof would be broken and damaged when the shift lever 31 was moved to the position corresponding to the pawl-engaged position if the pawl tooth 22 was not in registration with the teeth on gear 12. It will also be appreciated that by virtue of the above-described construction, the force or torque developed by the vehicle operator, tending to rotate shaft 39 to engage the pawl tooth 22 with the gear 12, is not transmitted positively to lever 24, but rather, is converted to a yielding or resilient actuating force, tending to urge the pawl tooth 22 into engagement with the gear 12.

A hook-like projection 53, integrally formed with the lever 24, is spaced from the edge 54 of the lever 24 to provide a pocket 55 for engagement by lug 52. The width of the pocket 55 is equal to, or slightly larger than, the width of the lug 52. Counterclockwise movement of the arm 45 from the position shown in Figure 8, first causes the lug 52, as shown in Figure 9, to engage the edge 54 of the lever 24 just below the pivot pin 26 which is above the opening of the pocket 55, partially defined by the top surface 56 of the hook-shaped portion 53. Continued counterclockwise movement of the lever 24 from the position shown in Figure 9 to that position shown in Figure 10 is effected by the lug 52 bearing against the edge 54, and, at the same time, sliding downwardly with respect thereto until the lug 52 is disposed within the pocket 55. In order to unlock or release the propeller shaft 11 by disengaging the pawl 22 from the gear 12, the vehicle operator moves the shift control lever 31 in a direction to swing arm 40 in a clockwise direction as viewed in Figure 10. The arm 40 moves relatively to arm 45 until it engages the lug 48. Such initial movement of the lever 40 has no effect upon the position of lever 24 and merely releases or dissipates the yieldable or resilient force of spring 49 acting thereupon. Once arm 40 engages lug 48, the connection between shift lever 31 and arm 45 becomes positive in nature and continued movement of arm 40 in a clockwise direction positively moves lever 24 from the position shown in Figure 10 to the position shown in Figure 9 since the lug 52 when disposed within the pocket 55, is in abutting engagement with the hook-shape portion 53 and consequently any movement of the lug 52 in a clockwise direction causes the lever 24 to pivot about pivot pin 19 in a counterclockwise direction. It will be appreciated that such pivotal movement of lever 24 causes the pawl 21 to pivot downwardly to disengage the pawl tooth 22 from the gear 12. Hence, it will be appreciated that manually controlled means are provided for impressing a yieldable force tending to urge the pawl into locking engagement with the gear 12 and the same manually controlled means when operated in the reverse direction dissipate or remove the yieldable force and positively release the pawl tooth 22 from the gear 12.

Heretofore, one of the objectionable features of most parking locks of the positive-type was the chatter due to the partial engagement of the pawl tooth when the manual control means or lever was moved to the locking position before the vehicle motion had fully stopped. Furthermore, there also was a danger of failure of the parts due to the shock loads developed if the pawl tooth should completely engage before the vehicle speed was reduced to a safe minimum. The present invention contemplates the provision of a parking lock inhibitor, designated generally by numeral 57, to obviate these difficulties and objections. The inhibitor 57 includes a generally cylindrical body member 58 having a bore 59 therein closed at one end. The axis of the bore 59 is parallel and spaced below the axis of the pivot pin 20. A piston 60 is slidable within the bore 59 and carries an inhibitor pin 61 which is slidable in the bore 59. An arm 62 integrally formed with a pawl 21 is movable in a plane parallel to the end face 63 of the member 58 when the pawl 21 moves between its fully released and engaged positions and is adapted to sweep across the end opening of the bore 59 in the end face 63. A helical-wound spring 64 disposed within the bore 59 and encircling the pin 61 yieldably urges the piston 60 against a plug 65 closing one end of the bore 59 and the pin 61 away from the arm 62. In most automatic and semi-automatic transmissions of present-day design, one or more speed responsive governors are employed for modulating the oil pressure delivered by pumps in accordance with cer-